United States Patent
Yanke et al.

(10) Patent No.: US 10,582,660 B2
(45) Date of Patent: Mar. 10, 2020

(54) AGRICULTURAL HARVESTING HEAD WITH FLOAT ARM PIVOTS BELOW RECIPROCATING KNIVES

(71) Applicant: Deere & Company, Moline, IL (US)

(72) Inventors: Bryan R. Yanke, Eldridge, IA (US); Daniel S. Hoffman, Bettendorf, IA (US); Adam L. Heeren, Taylor Ridge, IL (US); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 122 days.

(21) Appl. No.: 15/725,231

(22) Filed: Oct. 4, 2017

(65) Prior Publication Data

US 2019/0098831 A1    Apr. 4, 2019

(51) Int. Cl.
| | |
|---|---|
| *A01D 41/14* | (2006.01) |
| *A01D 34/04* | (2006.01) |
| A01D 61/02 | (2006.01) |
| A01D 61/00 | (2006.01) |

(52) U.S. Cl.
CPC .............. *A01D 41/14* (2013.01); *A01D 34/04* (2013.01); *A01D 41/141* (2013.01); *A01D 61/002* (2013.01); *A01D 61/008* (2013.01); *A01D 61/02* (2013.01)

(58) Field of Classification Search
CPC .... A01D 41/14; A01D 41/141; A01D 41/145; A01D 34/04; A01D 34/24; A01D 34/283; A01D 34/286; A01D 34/28; A01D 61/002; A01D 61/008; A01D 61/02; A01D 67/00

See application file for complete search history.

(56) References Cited

U.S. PATENT DOCUMENTS

| | | | | |
|---|---|---|---|---|
| 2,807,127 | A * | 9/1957 | Scheidenhelm | A01D 57/20 172/439 |
| 3,142,375 | A * | 7/1964 | Luke | A01D 61/008 198/613 |
| 4,742,671 | A | 5/1988 | Bich | |
| 6,250,055 | B1 | 6/2001 | Franet | |
| 2003/0074876 | A1 | 4/2003 | Patterson et al. | |
| 2014/0041352 | A1* | 2/2014 | Johnson | A01D 41/141 56/10.2 R |
| 2017/0311545 | A1* | 11/2017 | Walter | A01B 63/108 |

FOREIGN PATENT DOCUMENTS

| | | | | |
|---|---|---|---|---|
| DE | 9117195 | U1 * | 2/1996 | ............ A01D 41/14 |
| EP | 2374344 | A2 | 10/2011 | |
| WO | 91/12709 | A1 | 9/1991 | |
| WO | 9112709 | A1 | 9/1991 | |
| WO | 02/102138 | A1 | 12/2002 | |
| WO | 02102138 | A1 | 12/2002 | |

OTHER PUBLICATIONS

European Search Report issued in counterpart application No. 18196312.5 dated Feb. 28, 2019. (8 pages).
Search Report issued in counterpart application No. EP18196312.5, dated Feb. 28, 2019 (5 pages).

* cited by examiner

*Primary Examiner* — Alicia Torres
*Assistant Examiner* — Adam J Behrens

(57) ABSTRACT

An agricultural harvesting head includes a laterally extending frame with several spaced apart float arms pivotally coupled to the frame at their rear ends, and a reciprocating knife fixed to the forward ends of the float arms, wherein the float arms are constrained to pivot with respect to the frame about pivot points that are lower than the reciprocating knife.

17 Claims, 5 Drawing Sheets

AGRICULTURAL HARVESTING HEAD WITH FLOAT ARM PIVOTS BELOW RECIPROCATING KNIVES

FIELD OF THE INVENTION

This invention relates generally to agricultural combines. More particularly it relates to for agricultural harvesting heads for mounting on agricultural combines. Even more particularly, it relates to floating cutter bars for agricultural harvesting heads.

BACKGROUND OF THE INVENTION

Agricultural harvesters, such as agricultural combines, are designed to travel through agricultural fields harvesting crops. Agricultural combines receive crop severed from the ground and convey it to threshing, separating and cleaning devices within the agricultural combine.

In a typical arrangement, the agricultural harvesting head severs the crop from the ground and conveys it to the central region of the harvesting head. It is then conveyed rearward into a central and forwardly opening aperture in the front of the agricultural combine proper.

A reciprocating knife extends is fixed to the frame of the agricultural harvesting head and extends across the entire lower leading edge of the agricultural harvesting head. The reciprocating knife is supported on the forward ends of elongate arms that are pivotally coupled to the frame at their rear ends. The arms can pick it up and down independently of each other, thereby permitting the reciprocating knife to flex and also pivot up and down as it follows the contours of the ground during harvesting.

In this manner, the reciprocating knife can closely follow the contours of the ground as it undulates and sever the crops immediately adjacent to the ground.

The closer the reciprocating knife gets to the surface of the ground, the more likely it is to dig into the ground. When the reciprocating knife digs into the ground, it causes the arms to be pulled downward and bury the reciprocating knife in the earth. This can cause significant damage to the knife, the arms, and the agricultural harvesting head, generally.

US 20030074876 A1 discloses a crop harvesting header for mounting on a propulsion vehicle such as a swather, tractor or combine harvester includes a main frame structure supporting a crop receiving table with a cutter bar across a front of the table and side drapers on the table for moving the cut crop toward a discharge location of the header. The frame is divided into a central frame portion and two separate wing frame portions each arranged for pivotal movement relative to the central portion about a pivot axis extending in a plane parallel to the forward direction and intersecting the cutter bar so that, as the wing frame portions pivot, the cutter bar flexes in the area adjacent the respective pivot axis over a small angle of the order of 4 degrees to maintain the cutter bar following the ground. The central frame portion is mounted on two spring arms for upward and twisting floating movement such that the total downward force on the ground, from that part of the weight of all of the portions of the header which is unsupported, can be varied by moving the support to change the total pressure of the header on the ground. The wing frame portions are connected to the central frame portion by interconnecting linkages which transfer weight from the wing frame portions to the springs of the central portion each including a respective balance beam arranged to balance the lifting force from the spring with the downward forces from the center portion and wing frame portion such that the downward force on a skid plate of each portion on the ground varies automatically as the total downward force is varied. A bottom stop is arranged with a balance system which holds the cutter bar straight when the header is raised.

EP 2374344 discloses a flexible cutter bar header (22) for an agricultural plant cutting machine (20), that includes a plurality of elongate, telescoping support arms (32) pivotally connected to a floor (40) of the header and supporting a flexible cutter bar (24) for upward and downward (A), and fore and aft (B) movements relative thereto, apparatus (50, 52) extending between at least some of the support arms (32) configured and operable for controlling the telescoping thereof substantially uniformly, and a preload adjusting system (26) configured and operable for applying a preload force against the cutter bar (24) through the support arms (32) in a manner to automatically increase as the support arms (32) telescopically increase in length, and automatically decrease as the support arms (32) telescopically decrease in length.

U.S. Pat. No. 6,250,055 discloses a mower-conditioner that includes a header suspended from a mobile, main transverse frame by a pair of lower links, a single upper link and a pair of counterbalance springs. The upper link incorporates a threaded spindle to which a crank is coupled for changing the effective length of the upper link which extends between respective bearings carried by the main frame and the header and in this way pivots the header about the horizontal transverse axis defined by the bearings at the forward ends of the lower links so as to change the cutting angle of the cutter bar incorporated in the header. The upper link is mounted for sliding through the bearing carried by the header so as to permit the header to pivot upwardly about the axis in response to the cutter bar coming into contact with an obstacle during cutting operation. A coil compression spring is received on the upper link and biases it to its full effective length, the spring acting to cushion any impact of the cutter bar with an obstacle tending to tilt the header and acting to return the header to its original position once the obstacle is passed. Counterbalance springs are coupled between opposite ends of the main frame and opposite sides of the header, the springs being substantially vertically oriented with their lower ends coupled close to the bearings at the fronts of the lower links which bearings are in turn displaced only a short horizontal distance from the center of gravity of the header so as to minimize the moments about the bearings due to the weight of the header and the force of the counterbalance springs.

What is needed is an agricultural harvesting head with floating arms and reciprocating knife that is less likely to dig deeply into the ground when the knife engages the ground. What is also needed is an agricultural harvesting head with floating arms and reciprocating knife that tend to lift the reciprocating knife upward whenever the knife starts to dig into the ground.

It is an object of this invention to provide such an arrangement.

SUMMARY OF THE INVENTION

In accordance with a first aspect of the invention, an agricultural harvesting head for an agricultural combine configured to move through a field in a direction "V" harvesting crops, the head comprising: a laterally extending frame configured to be supported on a feederhouse of the agricultural combine; a plurality of float arms each arm having a forward portion configured to be fixed to a reciprocating knife and a rear portion pivotally coupled to the frame that extend forward from the frame to pivot up and down with respect to the frame; a laterally-extending reciprocating knife fixed to forward ends of the arms to pivot up and down with the arms and to flex as the agricultural harvesting head travels over the ground, wherein the float arms pivot with respect to the frame about corresponding pivot points that are lower than the reciprocating knife.

The corresponding pivot points may be below the float arms, the surface of the ground, the reciprocating knife, or below ground-engaging skids fixed to forward ends of the float arms.

Each float arm may be coupled to the frame with a corresponding multi-bar linkage, and a geometry of the corresponding multi-bar linkage determines a location of the pivot point with respect to said each float arm and the frame.

The location of the pivot point may be below the multi-bar linkage.

The corresponding multi-bar linkage may include a first member pivotally coupled to and between said each float arm and the frame, and a second member pivotally coupled to and between said each float arm and the frame.

The float arm may be coupled to the frame by a cam arrangement.

The cam arrangement may include at least one roller engaged to a cam surface.

The cam arrangement may determine the location of the pivot point.

The cam arrangement may comprise two rollers, and a cam surface engaging the two rollers.

The two rollers may comprise at least one roller mounted for rotation on the float arm and a cam surface mounted on the frame.

The rollers may include at least one roller mounted on the frame and the cam surface mounted on the float arm.

The cam surface may comprise an elongate curved slot, and wherein the at least one roller is disposed in the slot.

The floating arms may be coupled to the frame with a plurality of links that pivot with respect to the frame and pivot with respect to the floating arms about axes that extend horizontally and perpendicular to the direction of travel of the agricultural combine with respect to the ground.

DETAILED DESCRIPTION OF THE PREFERRED EMBODIMENTS

In this discussion, the term "below", "above", or "underneath" refers to relative positions in a vertical direction.

Figure 1:
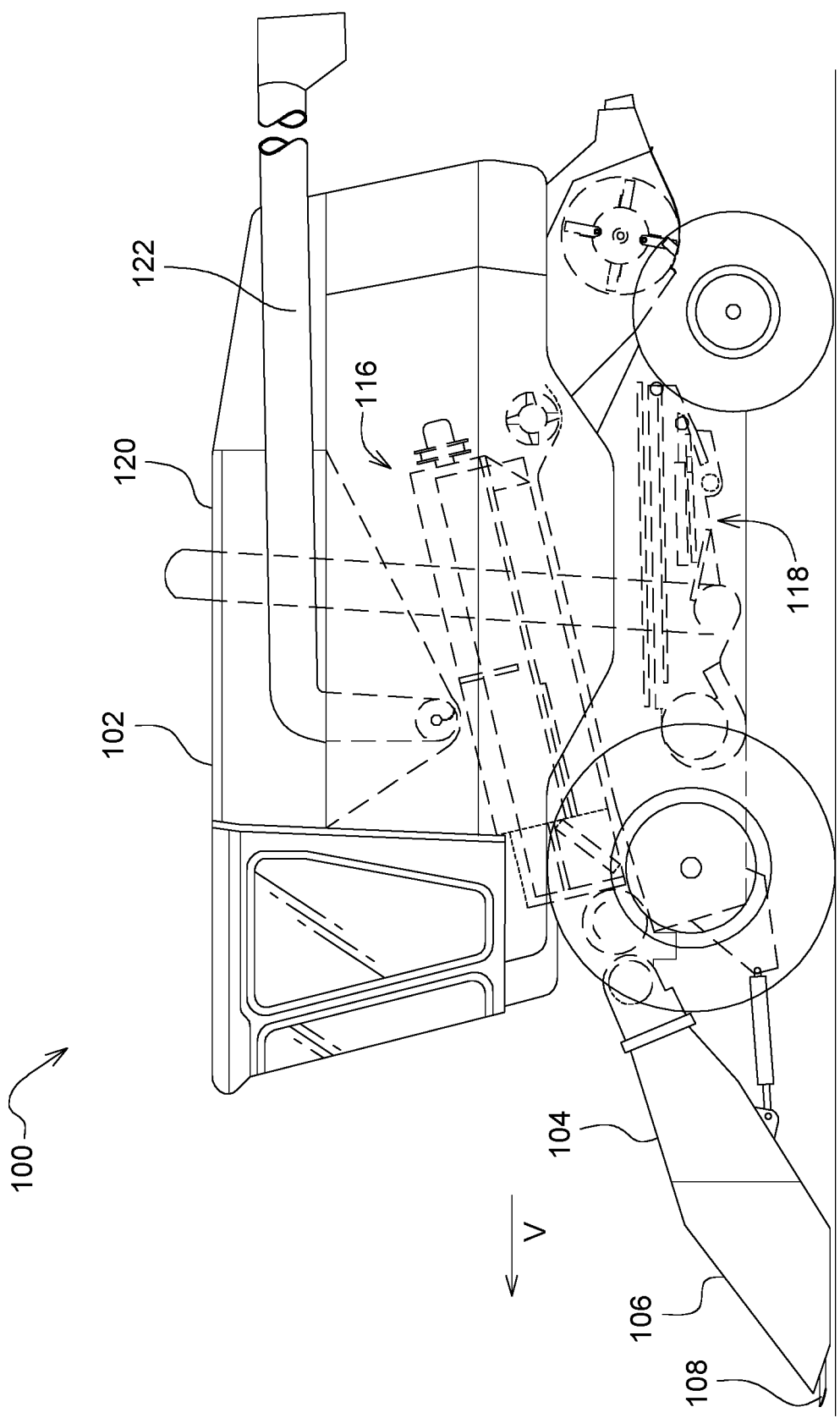
FIG. 1 is a side view of an agricultural harvester in accordance with the present invention.
Figure 2:
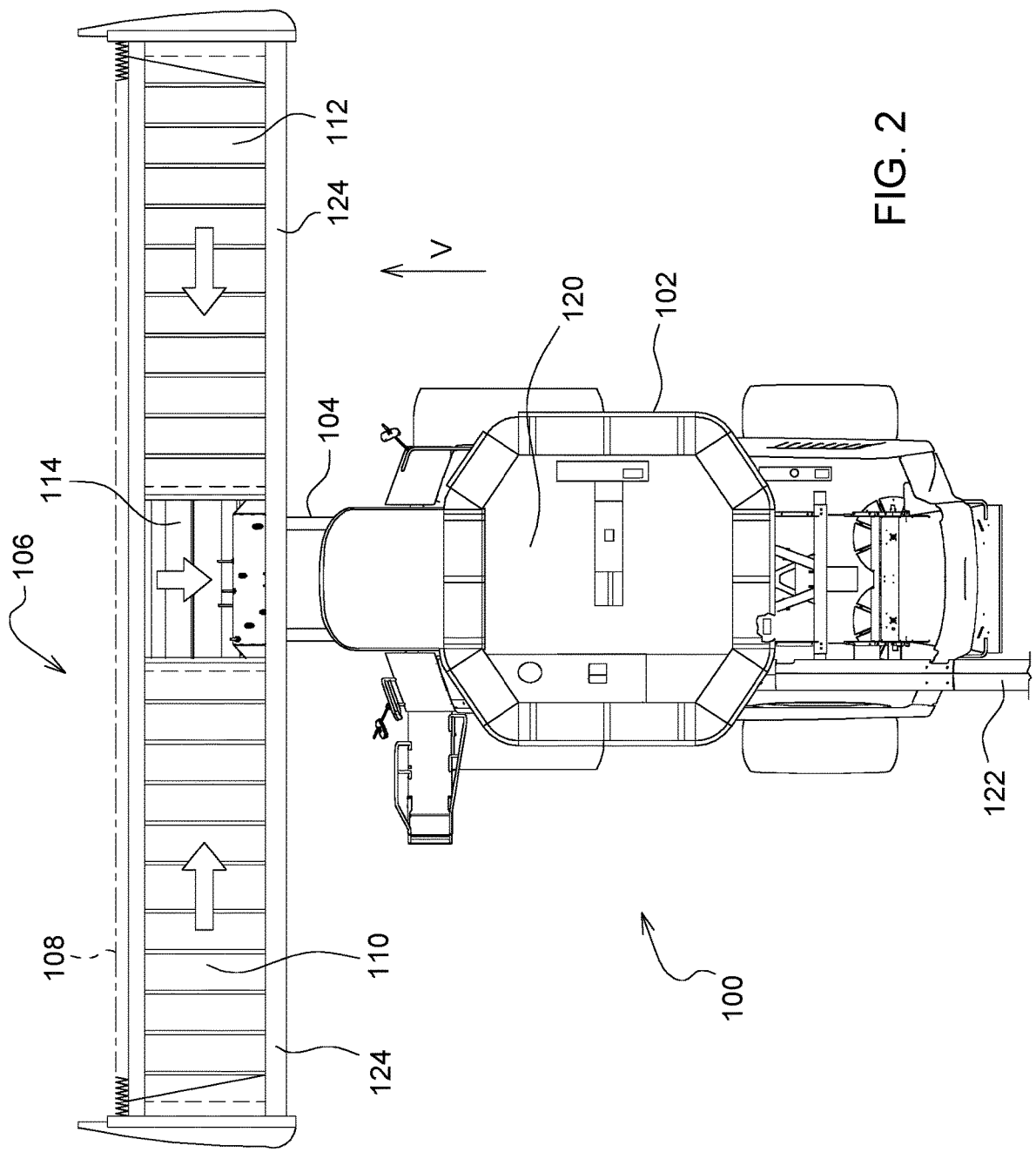
FIG. 2 is a plan view of the agricultural harvester of FIG. 1.

In FIGS. 1 and 2, an agricultural harvester 100 comprises an agricultural combine 102 having a feederhouse 104 extending from the front of the agricultural combine 102, and an agricultural harvesting head 106 supported on forward end of the feederhouse 104. The agricultural harvester 100 travels in a direction of travel "V" through the field to harvest crop.

Crop plants are severed by a reciprocating knife 108 that extends across the width of the agricultural harvesting head 106. The cut crop material falls backward on to a left side conveyor 110, a right side conveyor 112, and a center conveyor 114.

The left side conveyor 110 carries cut crop material to the right and deposits it on the center conveyor 114. The right side conveyor 112 carries cut crop material to the left and deposits it on the center conveyor 114.

The center conveyor 114 carries cut crop material rearward through a large aperture in the rear wall of the agricultural harvesting head 106.

The cut crop material passing through the aperture is conveyed into a front opening of the feederhouse 104. A conveyor inside the feederhouse 104 carries the cut crop material rearward and upward, through a rear opening of the feederhouse 104 and into a corresponding front opening of the agricultural combine 102 itself.

Inside the agricultural combine 102, a threshing and separating mechanism 116 threshes and separates the grain from the material other than grain in the stream of cut crop. A cleaning mechanism 118 disposed underneath the threshing and separating mechanism 116 cleans the grain by separating it from light residue such as chaff. A vertical elevator (not shown) carries the clean grain upward and deposits it in a grain tank or reservoir 120. The clean grain is subsequently removed by an unloading conveyor 122 which conveys the clean grain to a vehicle traveling alongside the agricultural combine 102.

Figure 3:
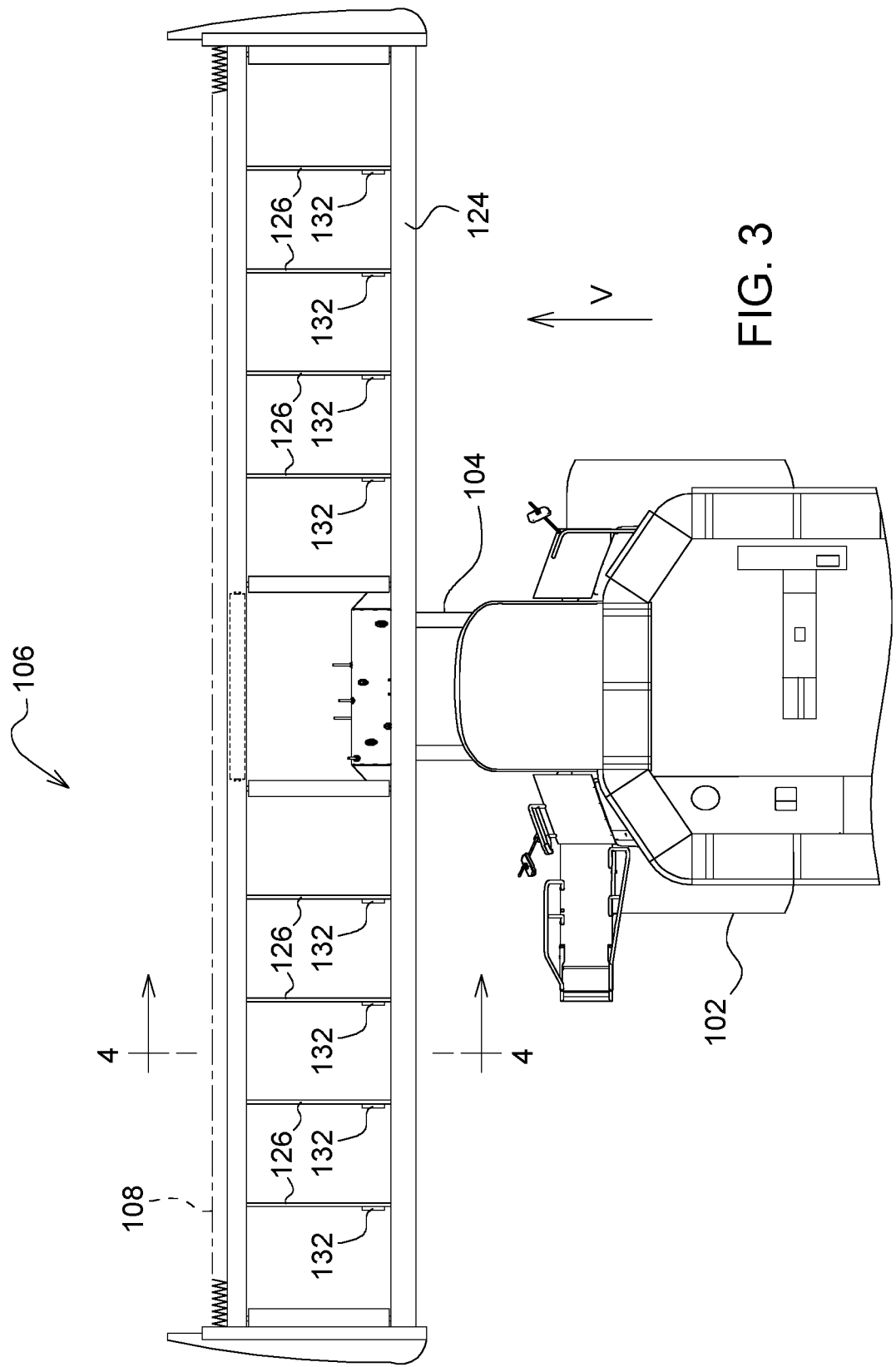
FIG. 3 is a plan view of the frame of the agricultural harvesting head of FIGS. 1-2.

Referring to FIGS. 2-3, the agricultural harvesting head 106 includes an elongate frame 124 that extends generally perpendicular to a direction of travel "V" of the agricultural harvester 100 as it travels through the field harvesting crops. The elongate frame 124 is configured to be supported on the feederhouse 104 of the combine: it has a large hole aligned with the front opening of the feederhouse 104, and is positioned immediately behind the center conveyor through which the cut crop material passes into the feederhouse 104. Further, the frame 124 has a releasable coupling arrangement to support the frame 124 on the feederhouse 104. Each of a plurality of pivoting arms 126 are pivotally coupled to the frame 124 at the rear ends to pivot about a corresponding horizontal and laterally extending pivot axis 128. The pivoting arms 126 are spaced apart across the width of the agricultural harvesting head 106 to provide distributed support to the reciprocating knife 108.

Reciprocating knife 108 is fixed to and supported on the front ends of the pivoting arms 126. The reciprocating knife 108 is flexible along its length in a generally vertical direction such that it can flex and follow the contours of the ground as the ground rises and falls underneath the agricultural harvesting head 106. The pivoting arms 126 on which the reciprocating knife 108 is supported accommodate this up-and-down flexing of the reciprocating knife and hold the reciprocating knife 108 in position at the forward margin of the agricultural harvesting head 106.

Each of the pivoting arms 126 has a skid 130 fixed to its front end adjacent to the reciprocating knife 108. As the agricultural harvester travels over the field, this skid 130 can lightly drag along the ground. As the ground presses up against the skid 130 the force provided by the ground lifts the forward end of the pivoting arms, causing them to pivot upward about their pivot points.

Each of the left side conveyor 110 and right side conveyor 112 comprises an endless belt that is supported on an inner roller adjacent to the center conveyor 114 and an outer roller adjacent to the respective distal ends of the frame 124.

Figure 4:
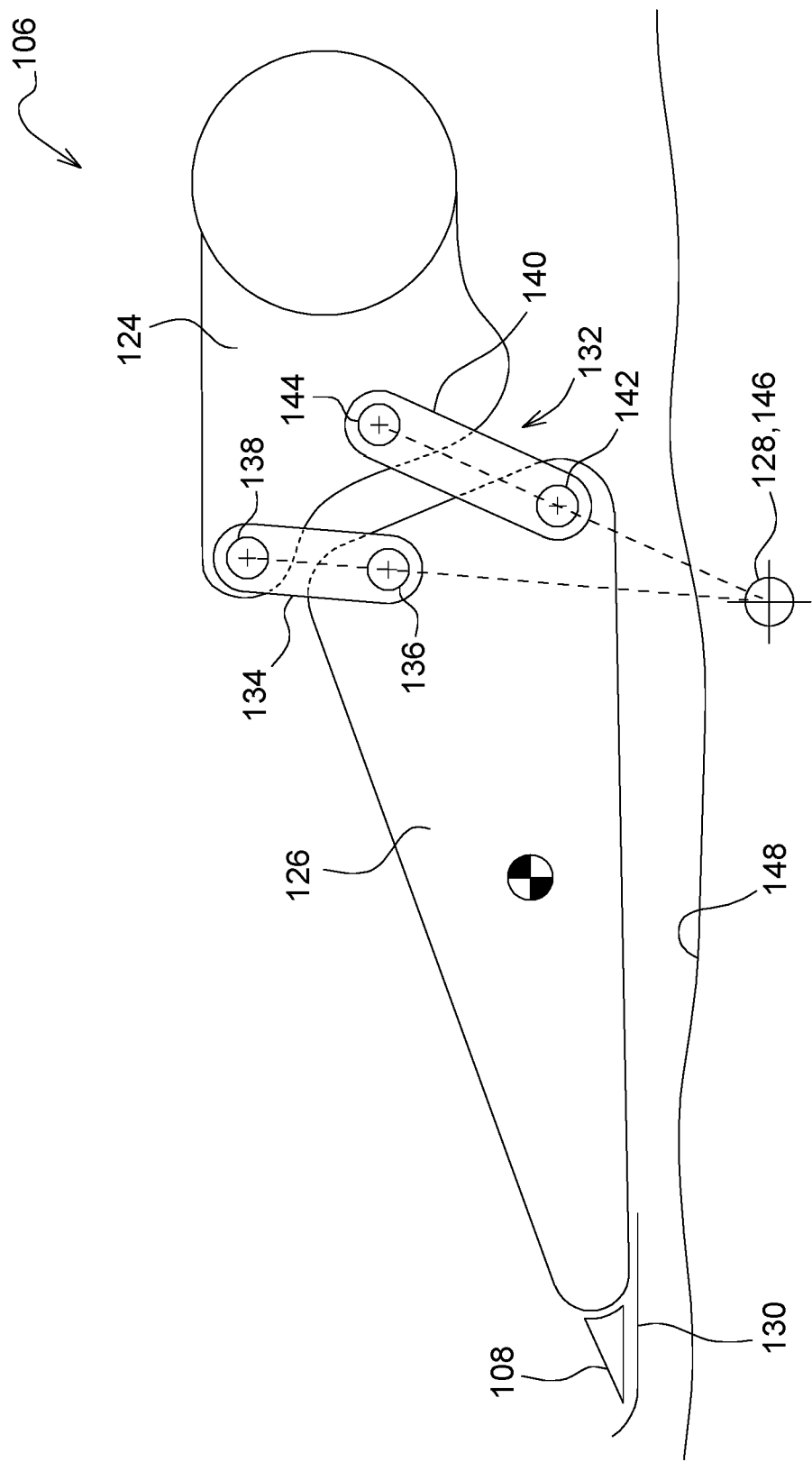
FIG. 4 is a cross-sectional view of the agricultural harvesting head of FIG. 3 taken at section line 4-4 and showing a first float arm arrangement in accordance with the present invention.

FIG. 4 is a side view of a single pivoting arm 126. This pivoting arm is the same as all the other pivoting arms 126 that are supported on the elongate frame 124. In the pivoting arm arrangement of FIG. 4, a multi-bar linkage 132 couples the pivoting arm 126 to the elongate frame 124. This multi-bar linkage 132 includes a first link 134 extending between the pivoting arm 126 and the frame 124. The first link 134 is pivotally coupled to the pivoting arm 126 at a first pivot joint 136 and is pivotally coupled to the frame 124 at a second pivot joint 138. The multi-bar linkage 132 includes a second link 140 extending between the pivoting arm 126 and the frame 124. The second link 140 is pivotally coupled to the pivoting arm 126 at a first pivot joint 142, and is pivotally coupled to the frame 124 to 2nd pivot joint 144.

The first link 134, the second link 140, the pivoting arm 126 and the elongate frame 124 function together to define a four bar linkage. Due to the geometry of the four bar linkage, the pivoting arm 126 pivots with respect to the elongate frame 124 about a pivot point 146 that is disposed below the pivoting arm 126, below the reciprocating knife 108, below the skid 130, and below the surface 148 of the ground.

The pivot point 146 is lower than pivot points are in the prior art. Therefore, if the reciprocating knife 108 or the skid 130 at the forward end of the pivoting arm 126 digs into the ground or runs into an object lying on the ground, the horizontal force applied to the reciprocating knife or skid by these obstacles will cause the pivoting arm 126 to lift upwards, away from the obstacle, as the pivoting arm 126 is forced backwards. This rearward and upward movement of the pivoting arm 126 will therefore tend to lift the front end of the arm 126 out of the ground and thus reduce the horizontal force. In short, the reciprocating knife 108 and skid 130 are lifted upward away from contact, rather than force downward into deeper contact us they would be if they pivoted about a pivot point located above the skid shoe and the reciprocating knife as shown in the prior art.

In this manner, any damage to the agricultural harvesting head 106 due to collisions with obstacles in the field is reduced.

There are other pivot joint arrangements that similarly permit a pivoting arm 126 to pivot about a pivot point below the pivot arm, the reciprocating knife, and/or the shoe when encountering an obstacle in the field.

Figure 5:
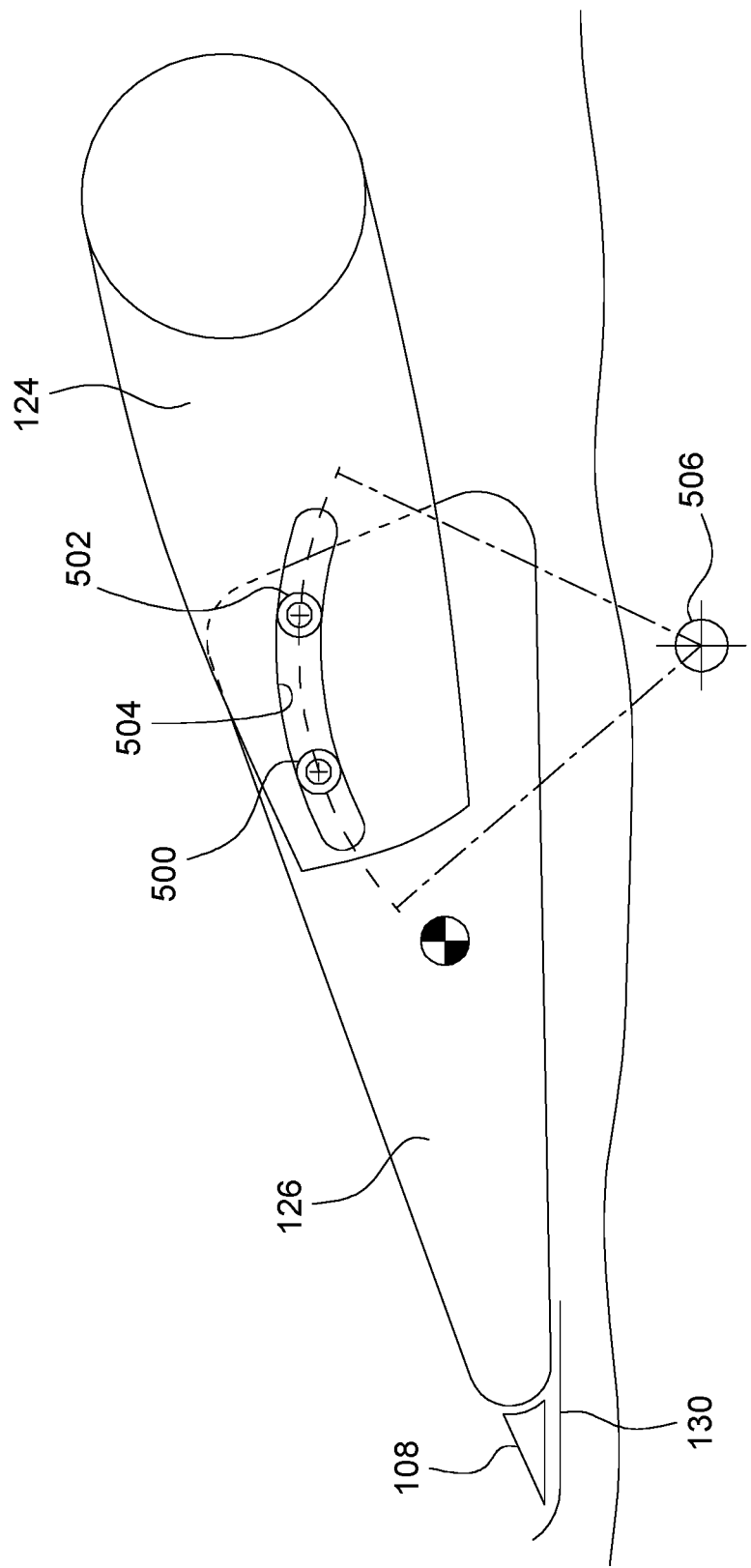
FIG. 5 is a cross-sectional view of the agricultural harvesting head of FIG. 3 showing a second float arm arrangement in accordance with the present invention.

In FIG. 5, for example, two rollers 500, 502 are fixed to the pivoting arm 126. The frame 124 has as an elongate curved slot 504 that receives the two rollers 500, 502. The slot 504 is longer than the distance between the two rollers 500, 502 and has the same width as the diameter of the two rollers 500, 502. Therefore, the pivoting arm 126 is constrained to roll back and forth in the slot 504. Due to the curvature of the slot 504, the pivoting arm 126 effectively pivots about a pivot point 506. Pivot point 506 is located at the center of curvature of the elongate curved slot 504.

Pivot point 506 (like pivot point 146 in the previous arrangement) causes the pivoting arm 126 to pivot with respect to the elongate frame 124 about pivot point 506. Pivot point 506 is disposed below the pivoting arm 126, below the reciprocating knife 108, below the skid 130, and below the surface 148 of the ground.

The invention is defined by the claims. The description and figures in this document are intended to show a few ways of making and using the claimed invention. Other ways of making the claimed invention are known to those skilled in the art.

The invention claimed is:

1. An agricultural harvesting head for an agricultural combine configured to move through a field in a direction (V) harvesting crops, the head comprising:
   a laterally extending header frame configured to be supported on a feederhouse of the agricultural combine;
   a plurality of float arms, each float arm having a forward portion and a rear portion pivotally coupled to the header frame and the rear portion extending forward from the header frame to pivot up and down with respect to the header frame;
   a laterally-extending reciprocating flexible knife fixed to forward ends of the float arms to pivot up and down with the float arms and to flex as the agricultural harvesting head travels over the ground, wherein the float arms are moveable relative one another enabling flexing of the reciprocating flexible knife, and each float arm pivots with respect to the header frame about a corresponding pivot point that is lower than the reciprocating flexible knife.

2. The harvesting head of claim 1, wherein the corresponding pivot points are below the float arms.

3. The harvesting head of claim 1, wherein the corresponding pivot points are below the surface of the ground.

4. The harvesting head of claim 1, wherein the corresponding pivot points are below ground-engaging skids that are fixed to the forward ends of the float arms.

5. The harvesting head of claim 1, wherein each float arm is coupled to the header frame with a corresponding multi-bar linkage, and further wherein a geometry of the corresponding multi-bar linkage determines a location of the pivot point with respect to said each float arm and the header frame.

6. The harvesting head of claim 5, wherein the location of the pivot point is below the multi-bar linkage.

7. The harvesting head of claim 5, wherein each corresponding multi-bar linkage includes a first member pivotally coupled to and between said each float arm and the header frame, and a second member pivotally coupled to and between said each float arm and the header frame.

8. The harvesting head of claim 1, wherein each float arm is coupled to the header frame by a cam arrangement.

9. The harvesting head of claim 8, wherein the cam arrangement includes at least one roller engaged to a cam surface.

10. The harvesting head of claim 8 wherein the cam arrangement determines the location of the pivot point.

11. The harvesting head of claim 8, wherein the cam arrangement comprises two rollers, and a cam surface engaging the two rollers.

12. The harvesting head of claim 11, wherein the two rollers comprise at least one roller mounted for rotation on the float arm and a cam surface mounted on the header frame.

13. The harvesting head of claim 11, wherein the rollers include at least one roller mounted on the header frame and the cam surface mounted on the float arm.

14. The harvesting head of claim 9 wherein the cam surface comprises an elongate curved surface, and wherein the at least one roller is disposed in the slot.

15. The harvesting head of claim 1, wherein the float arms are coupled to the header frame with a plurality of links that pivot with respect to the header frame and pivot with respect to the float arms about axes that extend horizontally and perpendicular to the direction of travel of the agricultural combine with respect to the ground.

16. The harvesting head of claim 7, wherein a lower end of the first member is pivotally coupled to the float arm and an upper end of the first member is pivotally coupled to the header frame, and a lower end of the second member is pivotally coupled to the float arm and an upper end of the second member is pivotally the header frame.

17. An agricultural combine configured to move through a field in a direction (V) harvesting crops, the agricultural combine comprising:
 a feederhouse; and
 a harvesting head comprising:
  a laterally extending header frame configured to be supported on the feederhouse of the agricultural combine;
 a plurality of float arms, each float arm having a forward portion and a rear portion pivotally coupled to the header frame and the rear portion extending forward from the header frame to pivot up and down with respect to the header frame;
 a laterally-extending reciprocating flexible knife fixed to forward ends of the float arms to pivot up and down with the float arms and to flex as the agricultural harvesting head travels over the ground, wherein the float arms are moveable relative one another enabling flexing of the reciprocating flexible knife, and each float arm pivots with respect to the header frame about a corresponding pivot point that is lower than the reciprocating flexible knife.

* * * * *